(12) United States Patent
Antoniou et al.

(10) Patent No.: US 6,783,080 B2
(45) Date of Patent: Aug. 31, 2004

(54) SYSTEMS AND METHODS FOR CONTROLLING TEMPERATURES OF PROCESS TOOLS

(75) Inventors: Matthew Antoniou, Lake Forest, CA (US); Bryan Christofferson, Orange, CA (US)

(73) Assignee: Advanced Thermal Sciences Corp., Anaheim, CA (US)

( * ) Notice: Subject to any disclaimer, the term of this patent is extended or adjusted under 35 U.S.C. 154(b) by 0 days.

(21) Appl. No.: 10/439,299

(22) Filed: May 16, 2003

(65) Prior Publication Data

US 2004/0035851 A1 Feb. 26, 2004

Related U.S. Application Data

(60) Provisional application No. 60/381,346, filed on May 16, 2002.

(51) Int. Cl.[7] .............................................. G05D 23/00
(52) U.S. Cl. ............... 236/78 D; 236/91 D; 236/12.12; 700/42
(58) Field of Search ................................ 236/78 D, 47, 236/91 R, 91 D, 93 R, 97, 12.12; 165/61, 263, 264; 700/29, 42; 340/606

(56) References Cited

U.S. PATENT DOCUMENTS

| | | | | |
|---|---|---|---|---|
| 4,861,960 A | * | 8/1989 | Haefner et al. ............. | 219/110 |
| 6,496,749 B1 | * | 12/2002 | Yamaguchi et al. ......... | 700/121 |
| 6,499,535 B2 | * | 12/2002 | Cowans ....................... | 165/206 |
| 6,554,196 B2 | * | 4/2003 | Sasayama et al. ......... | 236/12.12 |
| 6,659,361 B2 | * | 12/2003 | Sasayama et al. ............ | 237/28 |
| 6,688,532 B2 | * | 2/2004 | Nanno et al. .............. | 236/78 D |
| 2002/0107604 A1 | * | 8/2002 | Riley et al. .................. | 700/121 |

OTHER PUBLICATIONS

S7–200 Programmable Controller Systems Manual, Siemens Company, pp. 3, 4, 22–24, 31, 38, 145–154.

* cited by examiner

Primary Examiner—Marc Norman
(74) Attorney, Agent, or Firm—Jones, Tullar & Cooper PC

(57) ABSTRACT

A system and method for controlling a critical process variable, such as the temperature of one or more temperature control units for cluster tools in a semiconductor fabrication facility, uses dual interrelated PID) algorithms for interrelated but at times separate control of heating capabilities. The temperature control units operate with high power efficiency, because no heating energy is expended during cooling and non-transition modes. When approaching a temperature threshold, however, the heating algorithm is reinstated just long enough to provide minimum undershoot and enabling precise, low per consuming, steady state control at ±0.1° C., minimizing undershoot and enabling precise steady state control at ±0.1° C.

20 Claims, 10 Drawing Sheets

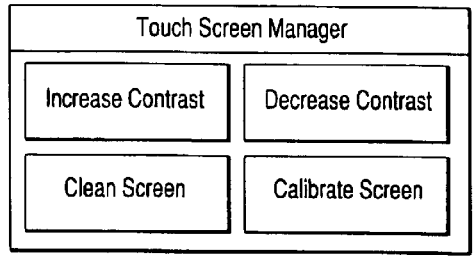

FIG.8f TOUCH SCREEN MANAGER

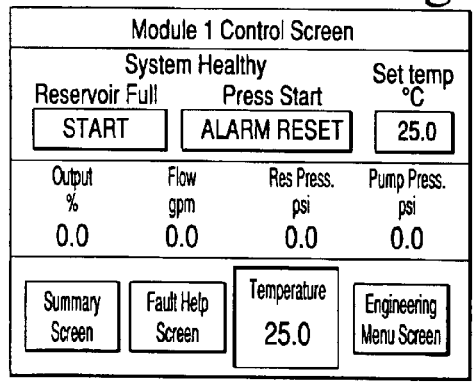

FIG.8g CONTROL SCREEN

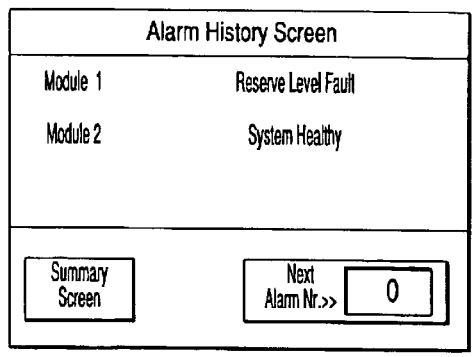

FIG.8h ALARM HISTORY SCREEN

FIG.8i HELP SCREEN

Help Screen 3

Alarms listed below require the Disconnect Switch to be turned off and the electrical cover removed
COMPRESSOR OVERLOAD
1. Wait three minutes and reset thermal overload breaker MSP1. Verify setting is @ 22-25A
PUMP MOTOR OVERLOAD
1. Wait three minutes and reset thermal overload breaker MSP2 for Module 1 or MSP10 for Module 2
HEATER/OVERTEMP/CB TRIP ALARM
1. Check Heat Transfer Flow through system
2. Check Heater Overtemp Switch and Heaters for proper operation
3. Reset CB3/CB11-CB12 for Module1/Module2

[Back]

FIG.8j PASSWORD SCREEN

Engineering Access Screen

Advanced Thermal Sciences
www.advancedthermalsciences.com

Access to Engineering Screens is password Protected.
Please enter password.

[ 0 ]

[Summary Screen]

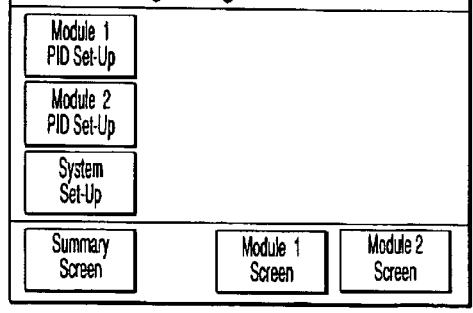

FIG.8k ENGINEERING MENU SCREEN

PID SET-UP
SCREEN

FIG.8l

Module 1 PID Set-Up Screen

| Cooling | Set Factory Default Values | Heating |
|---------|---------------------------|---------|
| -50.0 | Gain | -70.0 |
| .80 | Integral | 1.0 |
| .003 | Derivative | .003 |
| 0.0 | Lo Error Range Hi | 0.0 |

| Module 1 Screen | Eng. Menu | MB Address  1 | Temp Offset  0.0 |

SYSTEM
SET-UP
SCREEN

FIG.8m

System Set-Up Screen

Touch Screen Display Selection

- gpm
- Deg C
- psi

Pump Stop Delay Time 60.0 Seconds

Summary Screen                Back

SYSTEMS AND METHODS FOR CONTROLLING TEMPERATURES OF PROCESS TOOLS

REFERENCES TO PRIOR APPLICATIONS

This application relies for priority on a prior filed provisional application, Serial No. 60/381,346, filed May 16, 2002 and entitled, "Control and Display Systems for Modular Temperature Control Systems".

FIELD OF THE INVENTION

This invention relates to systems and methods for controlling process equipment temperatures, and more particularly to operator and automatically controllable digital systems for versatile modular based temperature control units.

BACKGROUND OF THE INVENTION

Digital control systems for process equipment and tools that are used for complex manufacturing procedures are known and in use in a wide variety of practical applications. Often, such systems are used to maintain one or a number of operating parameters at chosen static or variable setpoints during an operation or process. Control algorithms are used to interrelate sensed variables to target conditions, and to bring a controlled parameter to a chosen setpoint.

An important example of this use of control systems is in the operation of temperature control units (TCU) which heat or cool, in selectable fashion, one or more particular subunits of cluster tools employed in semiconductor fabrication. For some semiconductor fabrication process tools, TCU's may have to refrigerate or heat at different levels, changing levels when needed for the process. Usually, the temperature control is accomplished by circulating a thermal transfer fluid through the tool at temperatures and flow rates suitable for each given operating setpoint. Because cluster tool capital equipment and operating costs are very high, the temperature control units and their associated digital control systems must operate with maximum reliability and minimum down time. Moreover, steady state operation at a given temperature level is often required to be very precise while transition or ramp times between different steady state levels are desirably as short as possible.

Operation of such systems in practice, however, entails much more than operating stability and minimization of transition intervals. Initial installation, system setup, system monitoring and adjustment, trouble-shooting and field service are all factors which affect the economics and eases of use. In addition, TCU types and capabilities can vary substantially for a given cluster tool installation. For example, a new multi-TCU system has been introduced which is based on a modular approach in which different but interchangeable TCU modules are used. The modules each have at least two and up to four functional capabilities including both heating and cooling, and can have substantially different thermal capacities. Such TCU modules can control different subunits in a cluster tool, while meeting operational needs economically and in a space efficient manner. This approach also minimizes field service problems because troublesome and defective modules may quickly be replaced and either serviced on site or shipped to a common service facility. Generally, the different modular TCU's each have both heating and cooling capability, which can be exercised at the same time or independently.

A control system and method for operating different modules concurrently in different modes must present the options in such a way that the operator can be guided through the setup sequence and make needed choices without extensive pre-education or specialization. After setup, the operation should also be assisted with information at to real time operating conditions, significant changes in conditions, warning of problems and guidance as to how they can be resolved. Changes in the modular setup should be accommodated, and the control system should also be responsive to remote commands from a host system.

The digital control systems used for process control applications, being the process variable to a chosen operating setpoint and thereafter maintain the target setpoint with a closed loop servo approach. For improved response the servo loop follows a control algorithm, such as the PID (proportional, integral and derivative terms) algorithm to bring a process variable to a target level. A typical modern system using an algorithm of this type is designated model S7-200 and is a product of the Siemens Company. This digital control system includes programmed logic circuits, memory and software, together with various sensed inputs, for exercising the PID control algorithm. It operates in scanning sequences and includes expansion modules so that more than one process variable can be controlled concurrently. This control systems is not, by itself, capable of meeting more demanding requirements, such as those imposed on TCU's employed for control of semiconductor fabrication tool processes. For semiconductor fabrication processes, it is essential that steady state temperatures be very precisely maintained, but that transitions between different temperature levels be rapid. The heating and cooling capabilities must be used in making these changes, with maximum power efficiency. In addition, environmental and other variables which can arise must be compensated for. Because of the high capital and operating costs involved in semiconductor fabrication facilities, the system should also be capable of communicating information as to status and operating conditions, non-standard conditions, setup, warnings and alarms. Preferably, it should also automatically terminate operations when necessary.

SUMMARY OF THE INVENTION

A control and display system in accordance with the invention for a reconfigurable and complex control system having multiple control units accepts a variety of real time inputs and setpoints and generates commands for commanding individual units to regulate process variables. The commands are variable with time and based upon adaptive control algorithms which are responsive to changing operative and environmental conditions. The control system is particularly adapted for use with multi-module TCUs for cluster tools used in semiconductor fabrication, but is of applicability to other process and equipment meeting similar complex requirements.

It employs a scalable digital control system having a programmable logic controller, together with control and display software for setup, monitoring operator assistance and alarms. Using a touch screen and display unit, the system provides instinctively selectable, organized and unambiguous visual displays that facilitate selection and monitoring of operations. The operator, through observation of historical performance or by using known starting values, can provide initial setpoints for proportional, integral and derivative terms from which the dual adaptive control algorithm undertakes concurrent interrelated control of heating and cooling capabilities. While receiving data as to rate changes and historical changes in the process variables, ambient and cooling medium temperatures the system responds to temperature oscillations by making adjustments in the integral terms in both the dual algorithms. Also, bias values are changed in the heating algorithm in accordance with cooling medium changes.

The dual control algorithms are defined by data stored in the programmable logic controller associated with the data processor, an external section of the controller being changeable so that new programming can be used. Because use of the two oppositely directed thermal exchange capabilities (heating and cooling) is integrated, the heating algorithm is reset and no heating energy is supplied during cooling and non-transitional periods when the actual temperature is less than 0.2° C. below the setpoint. However, above that threshold the heating algorithm is reinstated, and a small bias value is added to assist the cooling function on maintaining the target level. Thus at the steady state temperature the heating capability and cooling capability are used concurrently in such fashion as to maintain the thermal transfer fluid at ±0.1° C. relative to the target level. The system control thus operates with high energy efficiency even though heating and cooling may be used concurrently in steady state. The ramp up or down from one temperature level to another is accomplished rapidly, with minimal undershoot and overshoot. Once temperature setpoint is reached the cooling PID will dominate the control thereby minimizing the heating requirement.

The expandable modules, used along with the central processor unit, comprise digital input expansion modules, thermocouple modules, analog circuit modules (including analog to digital circuits), along with receptacles for additional modules to accommodate further TCU expansion. The digital circuitry includes relay circuits, switching subsystems, and control subsystems. During the constant scanning cycle by the central processor, the processor also concurrently provides operator-requested displays on the touch screen and interface. The displays include a logical progression of different interactive graphics or "screens" to assist in all aspects of the operation. Setpoint screens enable the operator to observe the programmed conditions, and to vary them as appropriate. Information can be viewed that is specific to individual modules, such as flow rate, reservoir and pump pressures, percentage of heating or cooling, and actual temperature. A "summary" screen is available for general monitoring of operations for each module, including sensed conditions such as thermal process fluid actual temperature, and temperature setpoint. A separate screen display provides "engineering maintenance" data, including system settings display values, and pump delay characteristics. "Setup" screens enable default values for cooling and heating settings to be viewed for the dual PID control loops. On the same screen the operator can observe "configuration" data, indicating the number and type of TCU modules that are employed, and can also use access to an "engineering setup" screen, which provides readings from the sensors in the modules, and includes a running total of system run time and functions for mathematical corrections of desired values. A "fault" screen also provides information as to how to solve a problem that may be encountered, while a separate "help" screen is available to assist with data as to effective corrective efforts.

To provide remote control from the cluster tool system, the setup screen includes a configurable local address, so that a master/slave bus topology type network can be assembled. This network can encompass a variable number of units consisting of up to 4 modules, each of which can be governed by the remote central control in the user's facility.

BRIEF DESCRIPTION OF THE DRAWINGS

A better understanding of the invention may be had by reference to the following description, taken in conjunction with the accompanying drawings, in which.

i) 8*a* Startup screen
ii) 8*b* Summary screen
iii) 8*c* Startup procedure
iv) 8*d* Configuration screen
v) 8*e* Field service screen
vi) 8*f* Touch screen manager
vii) 8*g* Control screen
viii) 8*h* Alarm history screen
ix) 8*i* Help screen
x) 9*j* Password screen
xi) 8*k* Engineering menu screen
xii) 8*l* PID setup screen
xiii) 8*m* System setup screen

DETAILED DESCRIPTION OF THE INVENTION

Figure 1:
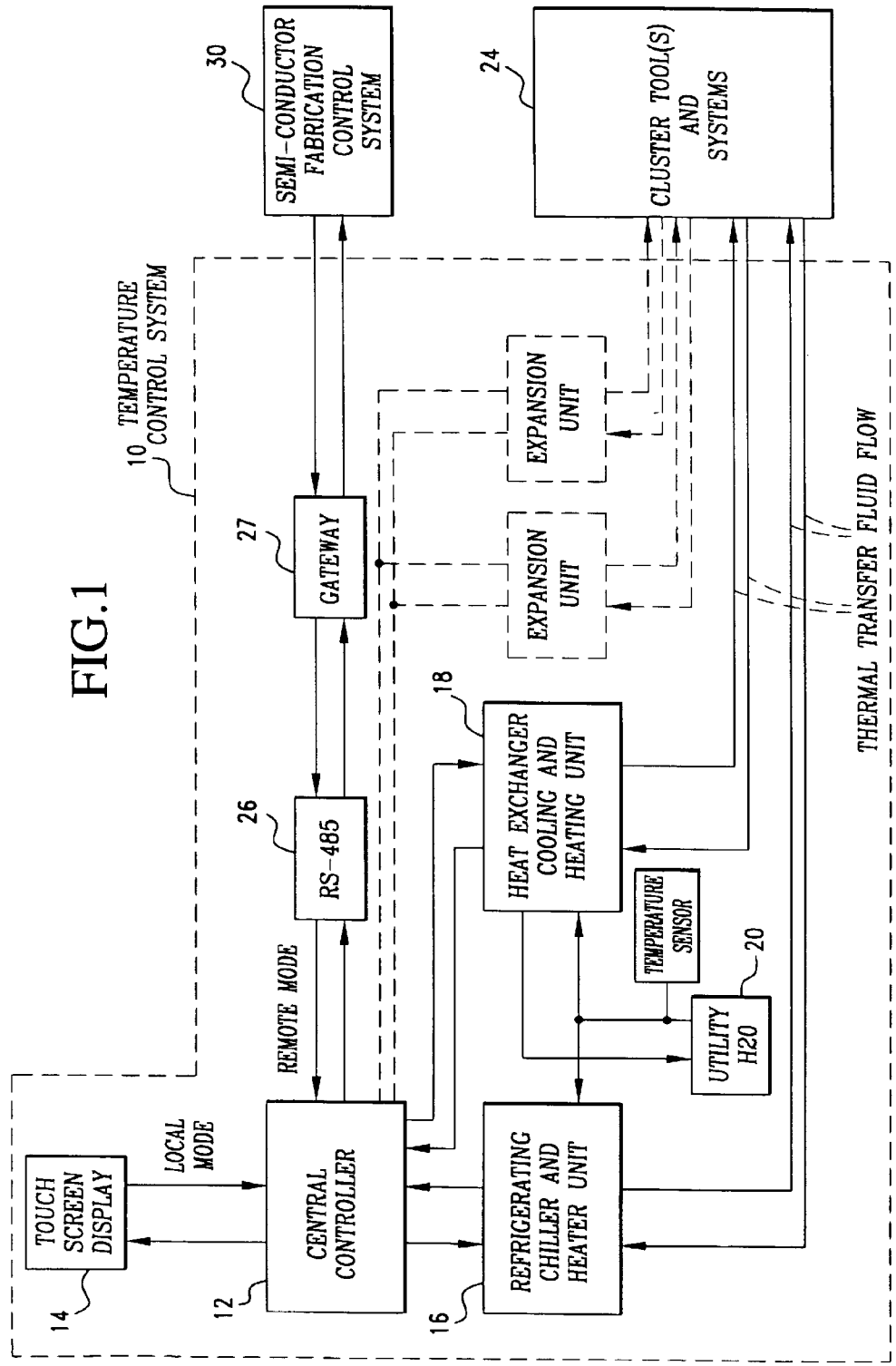
FIG. 1 is a block diagram representation of a control system in accordance with the invention, showing its use in conjunction with temperature control units which regulate the temperature of thermal transfer fluid being circulated through process tools, a central data processor system having a modular and expandable input unit, electronically programmable read-only memories and a number of process tools such as semiconductor cluster tools.

FIG. 1 illustrates one example of the use of a control system in accordance with the invention in relation to exemplary heating and cooling units for a system to be controlled, typically a cluster tool or tools in a semiconductor fabricating facility. The overall temperature control unit 10 of FIG. 1 comprises a central controller 12 having an associated touch screen display 14, which operates in conjunction with software, firmware, and circuit hardware in the controller 12. The touch screen display, 14, as is generally known, enables an operator to interact with a system by presenting visual choices, which initiate control actions when the screen is contacted at that point. The functionality is greatly extended in the present system, however, by using enabling software and hardware to define operative choices and status that are visible as "screens" on the display. These make available many different operative choices to be viewed, the status of different units to be monitored, and a number of variants to be introduced and thereafter controlled.

In this chosen example, two different types of heating and cooling units 16, 18 are used concurrently for meeting different temperature control needs and performance. Such multi-functionality is readily achieved by the aforementioned novel modular system, of employing interchangeable modules offering different thermal energy capabilities. Here the two modules, shown by way of illustration, include a chiller or refrigeration unit 16 having heating capability, and a heat exchanger module 18, which cools using utilities water from a source 20 and also has heating capability. As shown in FIG. 1, additional modules of different types may optionally be added. Each of the modules 16 and 18 generates signals representative of a number of sensed values, these including temperature, pressure and flow rate values that are supplied to the central controller 12. Each module 16, 18 includes control elements, such as valves and switches, which are to be selectively operated under control of circuits in the central controller 12. A cluster tool or tools 24 is in fluid circuit with each different one of the modules 16, 18, which separately supply thermal transfer fluid at given flow rates and temperature levels. The specified operating temperatures for subunits in the cluster tool 24 are required to be maintained within closely defined ranges, which also should be established as quickly as possible as procedures are changed at the process tools. The modules 16, 18 are selected to meet different thermal energy needs in an energy efficient manner and with low capital costs for their specific designs. The central controller 12 is designed to be expandable to accept more modules and to cooperate with different modules that may be more or less in number, and to adapt to operating conditions for best performance.

By operator selection, the controller 12 can function in a local mode, using setpoints and conditions established for given cluster tool subunits, or it can function in a remote mode, communicating via an RS 485 port 26 with the customer's semiconductor fabrication control system 30. In addition a protocol gateway 27 may be used to customize specific communication requirements. The needed degree of temperature precision is provided by a novel proprietary control loop system, to be described below, within the central controller 12.

Figure 2:
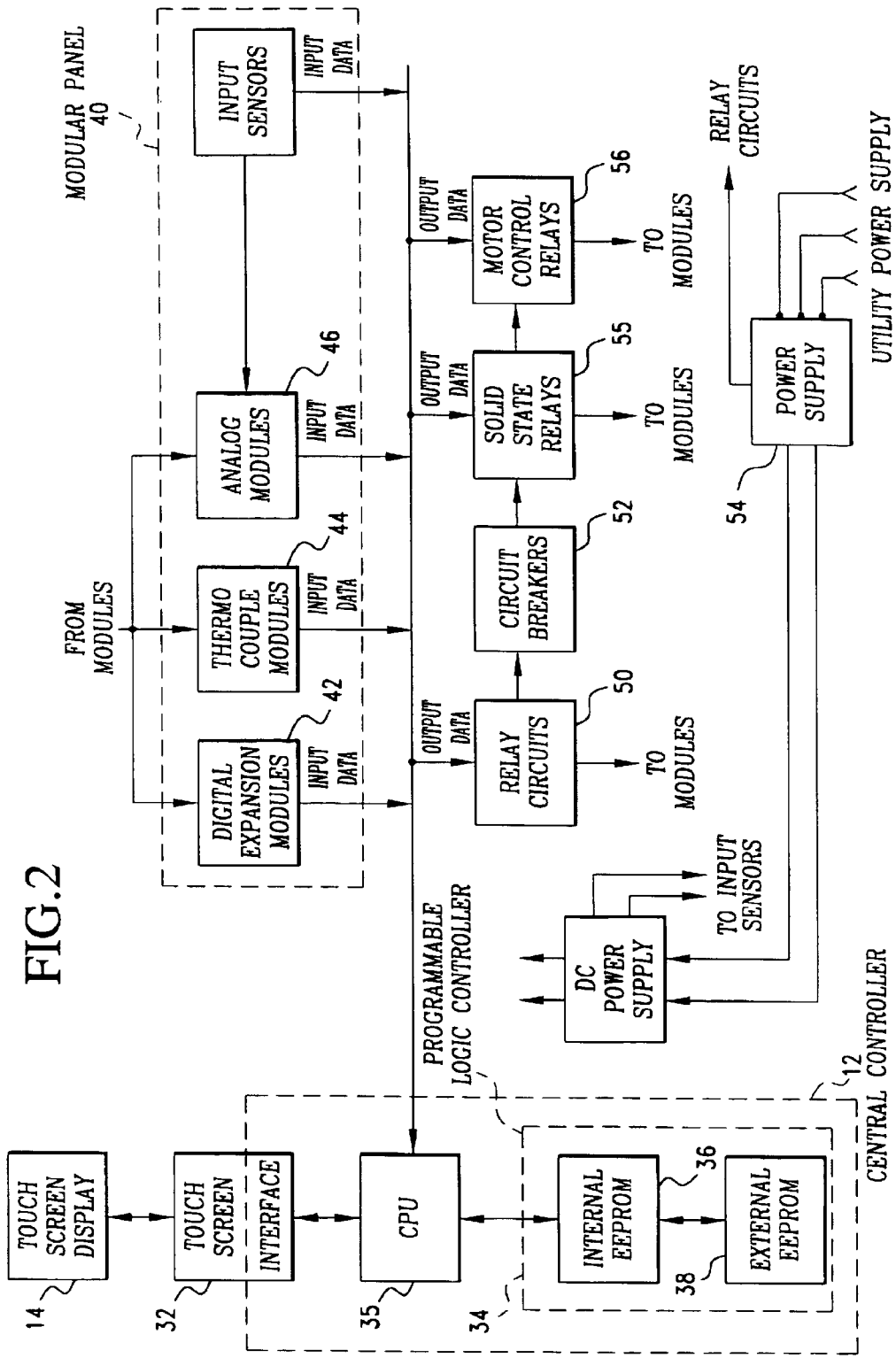
FIG. 2 is a block diagram of various control and input elements, in the control system of FIG. 1.

The general arrangement of hardware in the central controller 12, and the relation of the touch screen display 14 are shown in FIG. 2. The controller includes a touch screen interface 32, which receives software generated signals for generating commands received from the controller 34. A programmable logic controller 34 functioning with the controller 12 includes a high capacity EEPROM 36 (electronically controllable read only memory) internal to the controller 12, and an external EEPROM 38. The external EEPROM 38 facilitates substitution and addition of firmware for the many functions and changes which the system is able to implement.

Added functions, variations in system design, and expansion of operating modes to correspond to revised sets of TCU modules, are accommodated by insertion of plug-in circuits or small modules into available slots in a multi expandable modular component block 40 within the controller 12. The modular component block 40 includes a number of accessible receptacles for different types of modules, including a digital expansion module set 42, a thermocouple module set 44 and an analog module set 46. Digital expansion modules are inserted or interchanged in the set 42 depending upon the number of TCU modules used in the overall system. The thermocouple module set 44 converts sensed temperature signals from within the modules into digitally processible form with corrections for nonlinearities. The analog module set 46 responds to such analog readings as pressure and flow rate, and includes analog to digital conversion circuits for facilitating digital inputs to the system. Relay circuits 50 in the controller respond to the digital circuitry, enabling lower level switching and driving signals to control high power switches (e.g. compressors, pump and heaters) in the temperature control units. Higher power level signals are handled by elements relay circuits 50 circuit breakers 52, solid state relays 55 and motor control relays 56. The controller 12 includes its own power supply 54, providing voltage and amperage at the levels necessary for the different units.

The electrical system components thus consist of the Programmable Logic Controller 34 of FIG. 2, a CPU 35 Digital Expansion Modules 42, Analog Modules 46, Thermocouple Modules 44, Touch Screen Interface 32, Power Supply 54, Mechanical Control Relays 50, Thermal Magnetic Circuit Breakers 52, Solid State Relays 55, Motor Control Relays 56, and a Safety Disconnect or Main Circuit Breaker. Power relay circuits which are used to enable individual modules to be changed without disabling other modules are shown in partial form in FIG. 6, and a partial view of expansion modules is shown in FIG. 7. These are described below, but wiring and circuitry common to the Siemens S7-200 need not be described. This is what may be called a "Hot Change Out" feature.

These added electrical chips and circuit components, for a given expansion module, are all of the same type for those preserved elements. This allows for commonality of parts and ease of service and understanding of the control system. Each electrical system is built on a metal sub-plate, which can be lowered into a sheet metal chassis and secured.

The electrical system consists of three-phase power, 24 VDC power, and 24 VDC control power. The electrical system uses wire color codes and identifiers for system organization. Three-phase low or high voltage power wiring is black in color. The 24 VDC power is delivered from the power supply 54 on lines that are Dark Blue in color and the 24 VDC common wiring is Light Blue in color. The controller input power wiring is Gray in color. Each wire is numbered and matches the electrical documentation. Each terminal number has the same corresponding wire number. All components are clearly labeled and match the system documentation. All internal wires are contained within wire ducting, which clarifies the organization of the design. All field connections are connected at the front end of the electrical system. Wires from the terminal strip are connected to a 37-pin connector that is secured in the sheet metal chassis. Each module has a corresponding 37-pin connector for integration. This provides a modular slide in/out interface for each temperature control unit (TCU). Interlocks are configured so that a power plug will never be "live" during connection or removal.

a) The control system 12 is designed to control temperatures within +/−0.1 degrees C. The temperature setpoint can be set either locally by the touch screen interface 32, or remotely by the customer's semiconductor fabrication equipment 30. The two PID loops control the temperature by activating the heating and cooling solid state relays. The PID algorithms used in the Siemens S7-200 are supplanted by a unique dual algorithm for precise temperature control, with minimal overshoot and undershoot which is discussed below. It is to be understood that each TCU module (e.g. 16, 18 in FIG. 1) includes a pump that circulates the thermal transfer liquid through the associated external process tool. A refrigeration system (e.g. 16) provides a lower temperature chilling function than a "heat exchanger" (e.g. 18)

which uses a cooling medium such as facility water. Both include internal cartridge style heaters to provide higher level heating and precise temperature level maintenance.

Numerous safety devices and sensors are used to ensure safe and reliable operation for each module and provide signals which result in status indications on the display 14. All safety devices are designed to incorporate failsafe operation so that an alarm occurs if a sensor fails or becomes disconnected. Various system alarms require different shut down procedures depending on the severity. These procedures are organized in three types. A Type 1 alarm will shut down the entire module without warning. Type 2 alarms shut off all system elements and keep the pump running for a selectable time period (usually 60 seconds). Type 3 alarms keep the system running and disable the heating or the cooling portion of the control. Some alarm modes are module specific while others trigger faults for the entire TCU. Following are brief descriptions of a number of module and control system functions which are incorporated to safeguard against faulty conditions.

Emergency Stop Button (Type 1)—This button is located on the exterior of the electrical panel adjacent to the touch screen interface 32. When depressed a signal is removed from the PLC causing an error indication. Each TCU system has one Emergency Stop button.

Phase Monitor Relay (Type 1)—This relay provides protection against improper phase and under voltage. A contact closure is made when the relay is in an operational state. When opened (under-voltage or incorrect phase) an error will be generated.

Leak Detection (Type 1)—A sensor is mounted to detect fluid leakage from the system preventing large spills and potential hazards in the semiconductor facility.

Facility Water Detection (Type 2)—Certain modules require facility water flow, which provides one source of heat removal from the TCU. A differential pressure or flow sensor detects proper flow conditions. If flow is interrupted for a certain time period an error signal is generated.

Level Sensors—A liquid level sensor located in the system fluid reservoir monitors the level condition. Full, Warning, Fault, and Lockout levels are monitored. The Full and Warning levels activate a touch screen message but do not affect system operation. Fault and Lockout Levels are Type 1 alarms. The lockout level is a redundant hardware safety interlock to interrupt heater operation in case of rapid evacuation of the cooling liquid.

Compressor and Heater Overloads/Circuit Breakers (Type 2)—Thermal magnetic circuit breakers protect these devices. If a maximum current or short circuit rating is exceeded operation will stop. The pump will continue running for a selected time period.

Pump Overload (Type 1)—The pumps are protected by thermal magnetic circuit breakers that if tripped will cause the system to shut down. The pump overload is also linked to a hardware interlock to provide extra protection to stop heaters from running away.

Heater Over-Temperature Switches (Type 2)—Heater safety switches monitor the heater housings for higher than normal temperatures. If this condition occurs the heater power is removed and the pump continues to run for a programmed time period.

Exceeding Maximum or Minimum Fluid Temperature—Each TCU module has a designed temperature operating range. These temperature limits are programmed and password protected in the touch screen interface 32. Depending on the application, a temperature tolerance is added to these upper and lower limits. If these are exceeded the heating or cooling functions will be disabled respective of the upper or lower limit temperature alarms.

Temperature "Runaway" Detection—For precise requirements a PID level password (lower level password) can be entered to adjust the high and low level temperature band settings. If the temperature is between the band setting for 3 minutes the feature is enabled if temperature then exits the band are a "Temperature Runaway Detected" alarm will occur.

Reservoir or Pump Pressure too High—During certain run modes the system reservoir pressure may increase and vent to the atmosphere. This feature warns the operator before this occurs. An abnormally high pump pressure will also trigger an alarm that will protect the pump and system components.

When remote mode is selected the secondary PLC port is switched from program mode to communication mode. This enables a Modbus protocol to be enabled for operation under control of the customer's semiconductor fabrication facility 30 (FIG. 1).

Software Operation

The software consists of code programmed in ladder logic that is downloaded into the internal EEPROM 36 (FIG. 2) of the Programmable Logic Controller (PLC) 34. The external EEPROM 38 is also available for programming, which allows for customer software upgrades or remote modifications. The code is organized in several sub-routines, which allow for easy modification and configuration of additional TCU modules. An overview of the sequence of operation is provided in FIG. 3. The principal sequence of FIG. 3 can be subdivided into an initial setup and management procedure, followed by a transitional phase which merges into steady state operation. This is then maintained until a new operational mode having a different operating target temperature is commanded. The following is a list of sub-routines with their description of operation.

MAIN—This subroutine calls all of the sub-routines in the appropriate order to properly run the system. The sequence of how these sub-routines run is designed to ensure system safety and proper operation. A code that checks for correct passwords is included in this section. Because passwords are required to access certain parameters in the system. For increased system response time certain sub-routines are called only when needed. System startup procedures, which reset all PLC functions at startup, are included. The communications protocol is configured in this area, and depends on how many modules are used.

SETPOINT MANAGER—This subroutine handles all issues related to the temperature setpoint. In this subroutine temperature conversions are performed. The remote temperature setpoint is scaled, converted, and checked for accuracy. Temperature commands outside of the allowable specification of the TCU are rejected. Temperature monitoring functions that monitor temperature stability are in Setpoint Manager.

RUN CONTROL—This subroutine controls the start and stop modes for each module. In this subroutine timers are incorporated to properly sequence the startup of the devices. Run hour calculations are preformed and properly stored.

SCALER—This subroutine calculates and converts all of the analog inputs into real numbers. Scaling for pressures, temperatures, and flows are done in this area which provide the means of the displayed sensor values.

COMMON ALARMS—Alarms common to the TCU unit are organized here. These are alarms that affect the entire unit rather than specific module alarms. These alarms are emergency stop, phase monitor, system leak, facility water, etc.

MODULE SPECIFIC ALARMS—Each module has a subroutine dedicated to it for module specific alarms such as heater over temperature, circuit breaker trip, etc. These alarms affect the specific module operation only and not the entire TCU.

FAULT HISTORY—Fault history controls the storage of present and past alarms. As new alarms are generated the previous one is pushed down to the next lower position. Each module has a fault history subroutine which is the control for the proper management of alarms.

Temperature Control Algorithm

Figure 3:
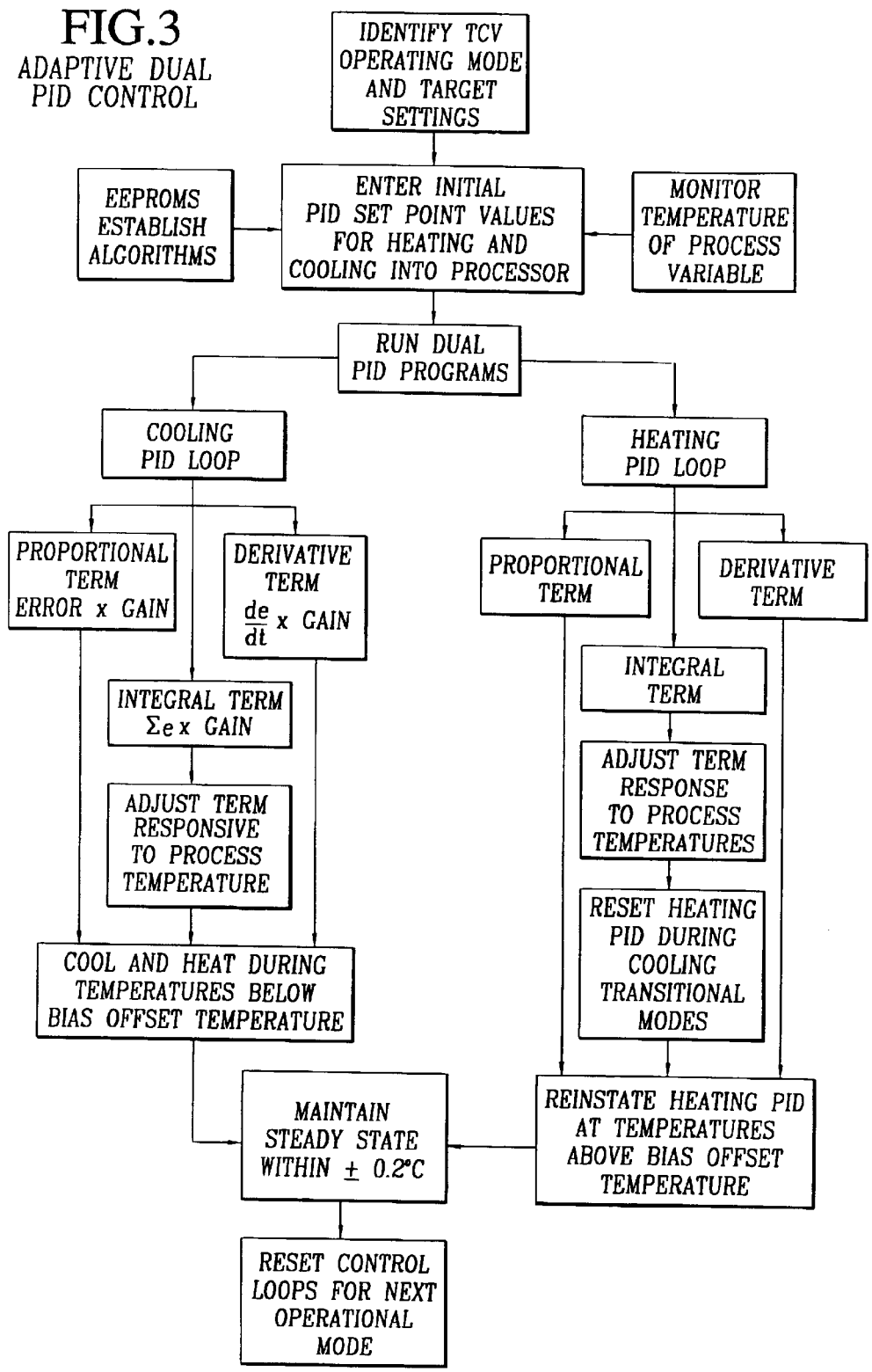
FIG. 3 is a flow chart of the steps used in the controlling software of the system.

Dual and adaptive PID loop control is used for temperature control applications. Proportional, Integral, and Derivative terms are used to properly establish a given system response to a process. However, the system relies on the proprietary dual loop PID control algorithm to control heating, cooling, steady state and transitional phases, as seen in FIG. 3. This unique control algorithm allows the chiller to maintain accurate process temperatures, quick ramp rates, and lower power consumption, which make the TCU superior for use with semiconductor process tools. The intuitive touch panel display allows for simple data input and retrieval. The manner in which improved control performance, as illustrated in the flow chart of FIG. 3, can be achieved will be better understood by initial consideration of how the individual terms (proportional, integral and derivative) are utilized in the prior art and in dual loop PID control.

Proportional action is also referred to as gain or proportional band. This output is a function of the difference between the setpoint and the instantaneous value of the process variable multiplied by the gain value. This means that the controller output moves in proportion to the error between the setpoint and process variable (in this case temperature).

Integral is often referred to as "reset". The integral term is proportional to the sum of the error over time. The current loop error is added to the previous integral sum (bias). This total is multiplied by the integral value constant (integral value/[0.25–1.0 seconds]) and then by the gain value. As the process variable nears the setpoint the integral output that is added to the bias is smaller and smaller due to the decrease in error.

Derivative action, also viewed as the rate of change in error, helps in anticipating the setpoint arrival. The higher the derivative term the more effect this output will have on the total output of the PID algorithm. The error is multiplied by the differential constant (Derivative term/[0.25–1.0 seconds]) and then multiplied by the gain value.

The traditional PID control algorithm is not sufficient for meeting the stringent requirements of +/−0.1° C. control, imposed by modern process tool environments such as in the semiconductor fabrication industry. The present "Adaptive Control" technology was devised to provide smart and versatile temperature process control. This loss in efficiency would require larger refrigeration components and increased energy consumption.

The heating algorithm therefore suspends heating during cooling periods (ramp down), until a threshold is reached. Then, however, the dual PID loops per one process variable are reinstated to ensure the most accurate temperature stability. Each time the temperature surpasses the self-adjusting threshold (bias offset), as it is lowered in temperature the heating PID loop is reinstated. An integral bias term is loaded into the PID calculation of the heating loop. This minimizes undershoot while trying to reach the temperature setpoint. The bias term also varies depending on the temperature ramp rate and the error signal, as established by the proportional value history. Adverse environments or facilities can affect the ramp rate, because of such factors as cooling medium temperature changes. With dual adaptive control the TCU is able to compensate for this.

When reinstated just below ambient temperature setpoints, the 0.2° C. bias offset is enough to allow the cooling PID to fully control and maintain temperature precisely. At temperatures above ambient, the cooling loop may not reach its target temperature. Under these conditions the bias offset will self adjust to allow the temperature to be reached, because the history of the error signal is preserved. The system adapts prior corrections not only in relation to bias offset and ramp rate, but in relation to attainable setpoints. FIG. 3 shows that at the last phase, steady state operation, there is the +/−0.1-degree temperature stability over time.

Figure 4:
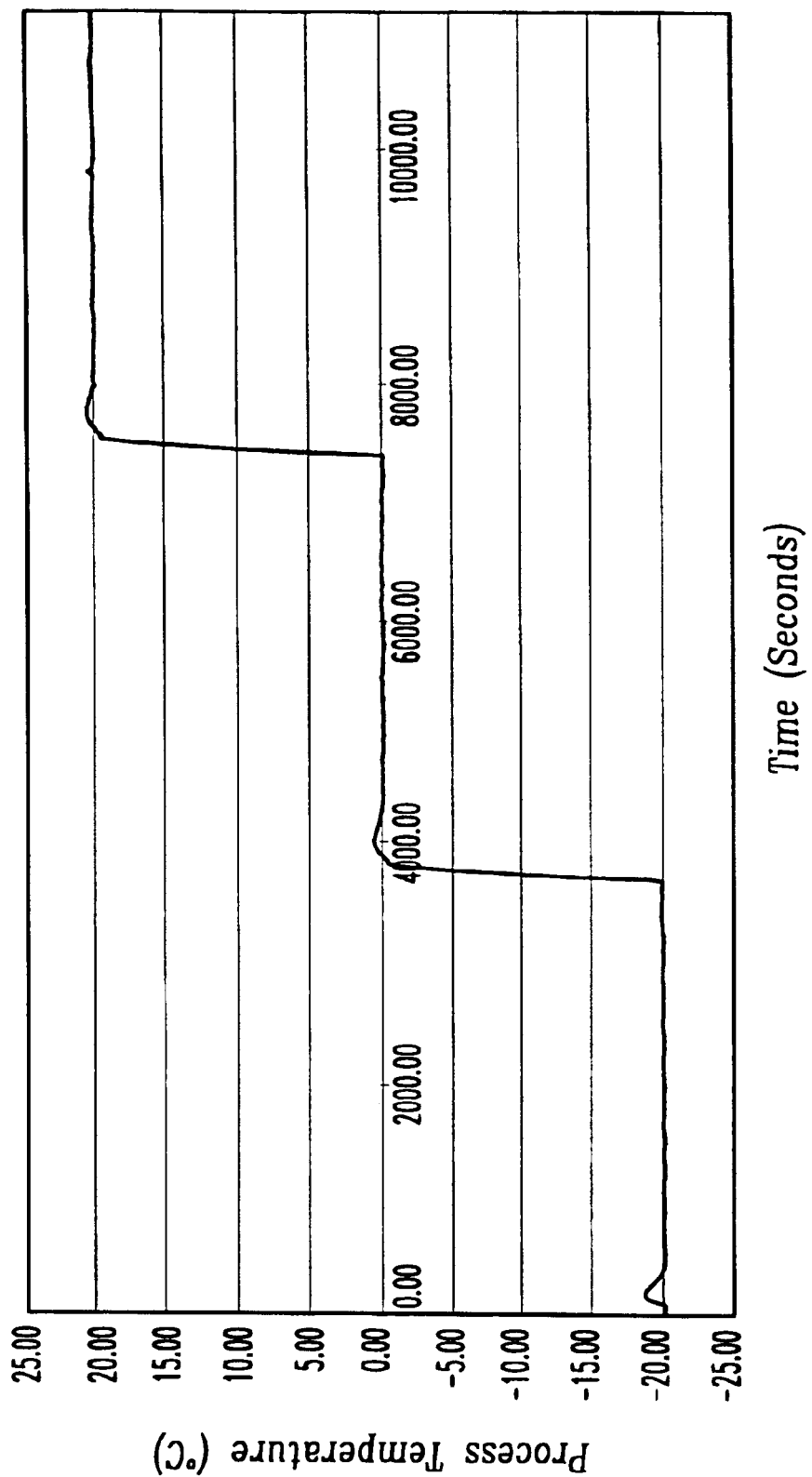
FIG. 4 is a graph of actual process temperature variations with time as a target operating temperature is varied in steps from below 0° C. to about +20° C. in a system.

FIG. 4 shows the temperature level performance of a TCU controlled by Adaptive dual PID algorithm as it ramps up from +20 to −20° C. reaching steady state conditions at −20° C. after reach steady state for a time at 0.0° C. There is only minimal overshoot at each level.

Figure 5:
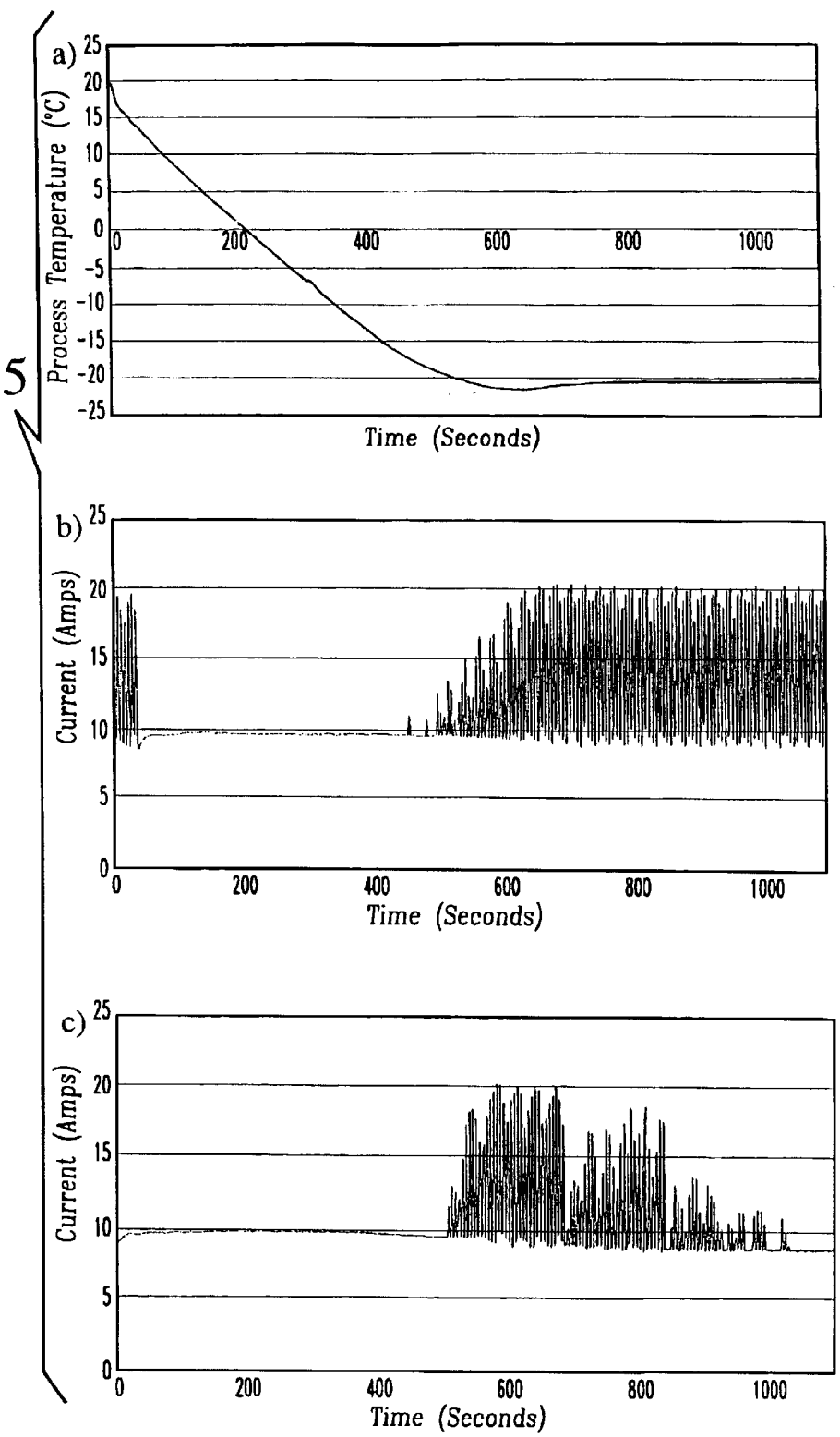
FIG. 5 is a set of three graphs a), b) and c), showing differences in power consumption required for a system that reduces process temperature monotonically to a steady state level, (FIG. a) when using a conventional PID algorithm (FIG. b) in comparison to an adaptive dual PID algorithm in accordance with the invention (FIG. c)

The graph of FIG. 5a, depicts the operating level of a process variable as it decreases monotonically from +20° C. to a steady state level at −20° C. The power consumption of the heating circuits with a conventional PID algorithm is shown in FIG. 5b. It demonstrates substantially higher and constant power consumption in the steady state modes, the predetermined operating condition. In contrast the power consumption with the Dual PID algorithm has only a brief higher peak when the steady state is reached, and then returns to intermittent and much lower values. Thus the power consumption is shown on FIG. 3c. It can be seen that the power consumption from the system is higher during heating (during temperature undershoot). Since the algorithm only uses heat when needed the current consumption drops off dramatically once the setpoint is reached. This results in a power savings of up to 47%.

Another drawback to the traditional PID algorithm is the constant addition of heat to the system. The refrigeration circuit, in order to meet desired operating setpoints must also remove this heat. This requires larger system components and can create wild swings in temperature control. Since the adaptive algorithm does not use heat during cooling periods, all of the heat removal capacity of the system can be directed toward the process and not system operating losses.

The CPU 35 depicted in FIG. 2, may be part of a Siemens S7-200 system, which includes multiple input terminals, such as: Emergency Stop Input; Phase Monitor/System Leak; Differential Pressure Switch; Flow Switch; Reservoir. Level Full; Reservoir. Level Warning; Reservoir. Level Fault; High Pressure Switch; Liquid Thermistor; Compressor/Pump Overload and Heater Fault.

Terminals including output wiring are individually coupled to a chiller or heat exchanger module and are outputs from unit 35 FIG. 2: Compressor Starter/Protection Module; Pump Starter; Cooling Solenoid Relay; Heating Solenoid Relay and Safety Circuit Reset.

Figure 6:
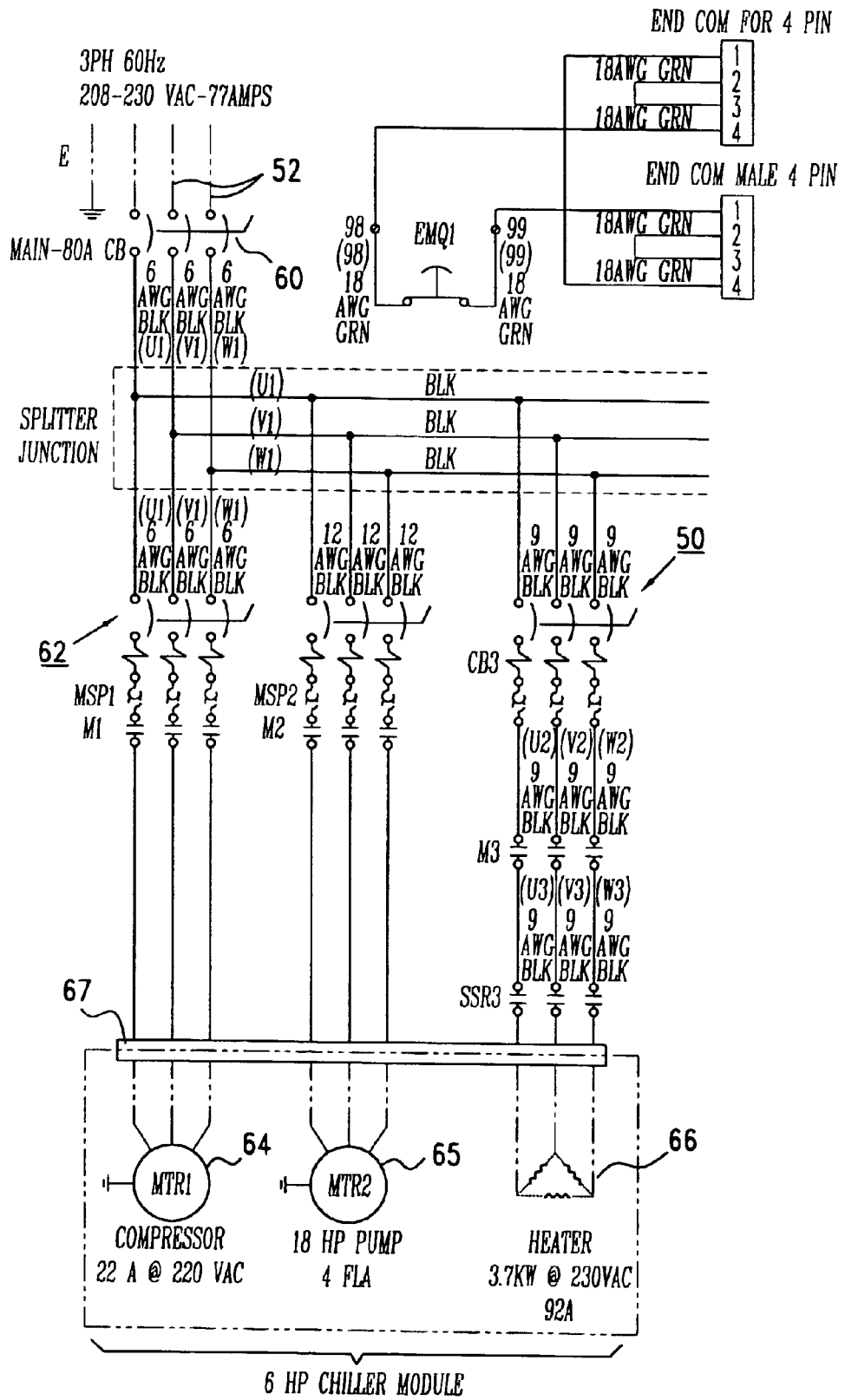
FIG. 6 is a diagram illustrating portions of circuits used in control of high power circuits in the system of FIGS. 1 and 2.
Figure 7:
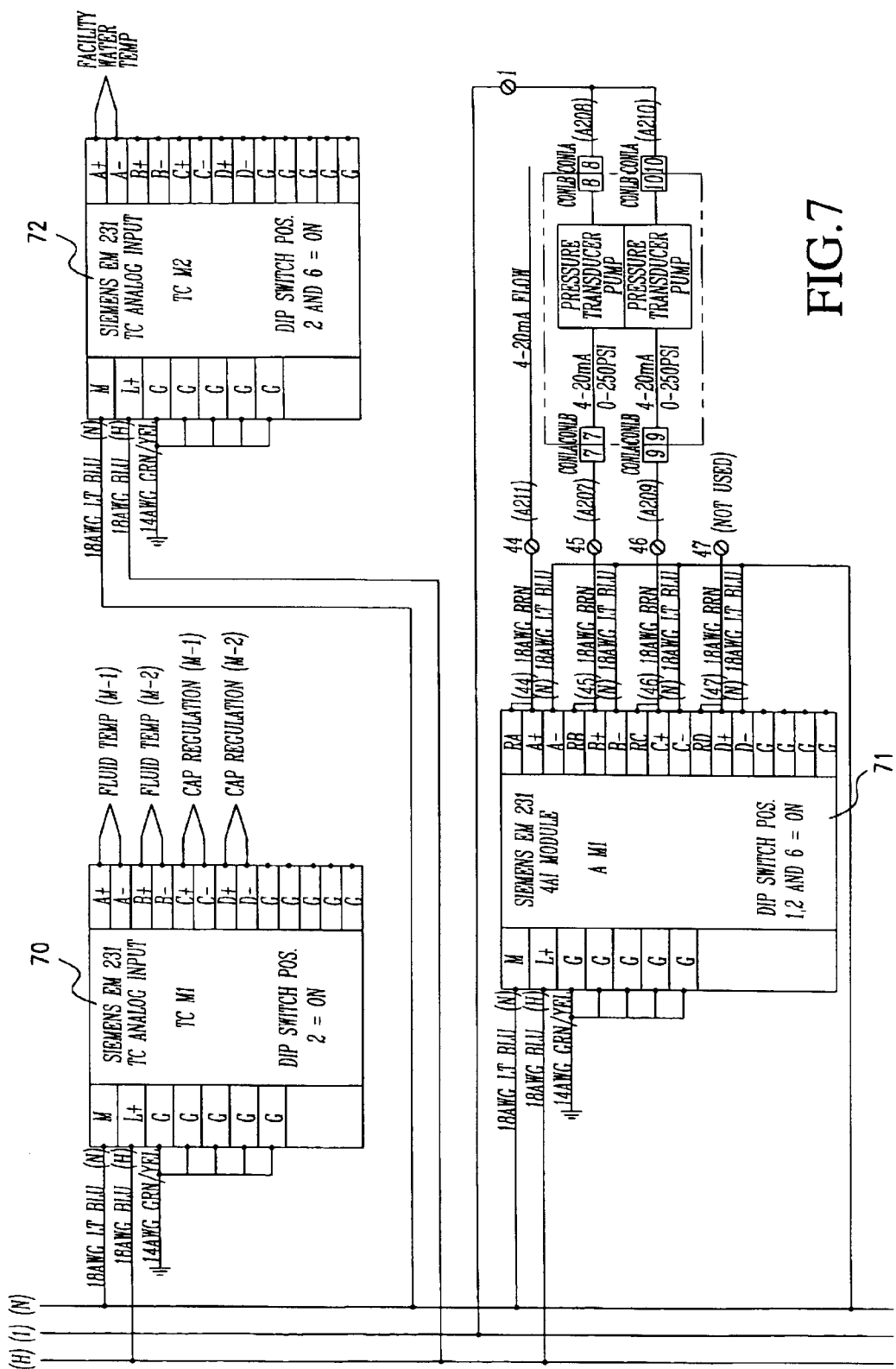
FIG. 7 is a simplified diagram of an example of an expansion module used in the system of FIG. 2.
Figure 8A:
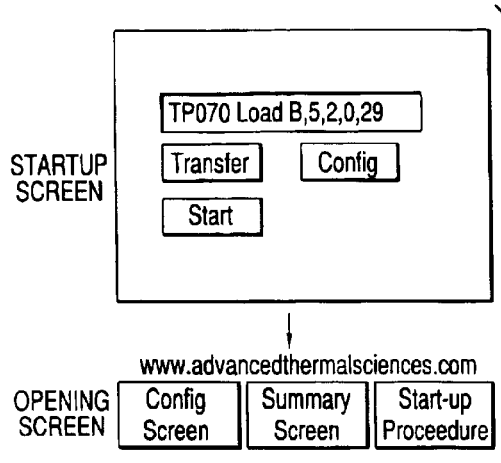
FIG. 8 is a series of screen displays used in setup, monitoring control and other operations by the operator and including.
Figure 8B:
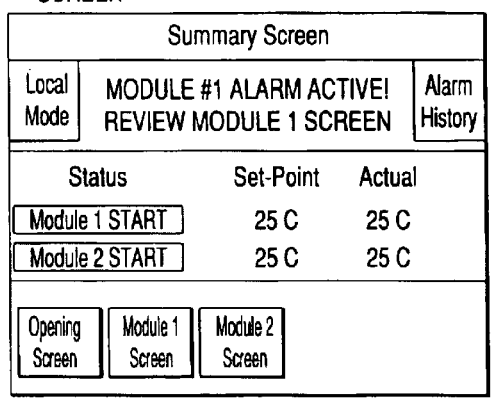
Figure 8D:
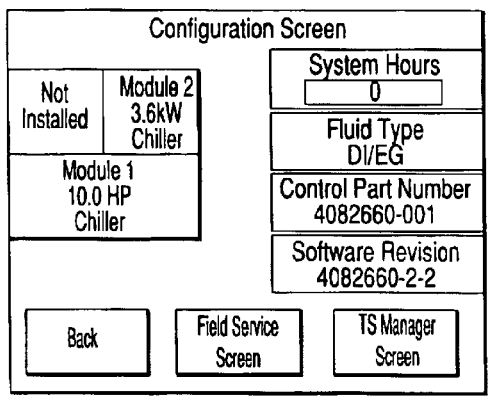
Figure 8C:
Figure 8E:

FIG. 6 depicts an illustrative portion of some of the Control Relay Circuits 50 (of FIG. 2) showing the interconnections between three phase, 60 Hz power lines 52, a main circuit breaker 60, separate breaker 62 for each of three main driven components (compressor 64, pump 65 and heater 66) which can be disconnected by operator activation of the switches or circuit breakers 62. Then a plug in panel 67 can be disconnected at the temperature control module to allow maintenance or replacement without exposure to hot power lines. These circuits thus act as safety interlocks for the power devices, and can optionally be activated by the CPU 35 using a line voltage switch. In event of software malfunction, mechanical interlocks act as a second line of protection. This is to meet various industry standards and ultimate safety to individuals operating the equipment. An internally protected and regulated power supply 57 in FIG. 2, serves as the 24 VDC power source for the Central Controller 12 of FIG. 1.

The block diagram of FIG. 2 includes the expansion modules 42, 44, 46 that are optionally insertable into the modular panel 40 of FIG. 2. The Expansion Modules allow for inclusion of more (or less) digital thermocouple, and analog inputs. These inputs accommodate system devices and monitors such as pump and reservoir pressure transducers, flow transducers, and other system related inputs (water ionization level, refrigeration pressures, etc.).

FIG. 7 shows some examples of analog inputs fed to expansion circuits, comprising multi-terminal DIP switches as in the Siemens EW-231 circuit modules 70, 71, 72. Each corresponds separately to a different TCU module, and imparts such values, as process fluid temperature, facility water temperature, flow rates and pressure levels. Not all of these apply to the dual PID algorithm but are illustrative of the monitoring and alarm functions the system also performs.

A dual-module temperature control system (TCS), such as a chiller 16 (FIG. 1) is designed to control the process temperatures of semiconductor fabrication equipment either in close proximity or in a remote/sub-fabrication location at a distance of up to 75 feet. In the LOCAL mode, control of the unit 16 is passed back to the touch panel screen 14. Service of any kind requires that the TCS be in the LOCAL mode. The TCS unit is also placed in LOCAL mode when a tool is being filled and drained.

Heat transfer fluid (e.g. Galden® HT 70, 110, 200 or DI Water/Glycol) circulates through heat exchangers in systems 16 and 18 FIG. 1 where it is either cooled or heated in a controlled process. The fluid is then passed, in a closed loop, to the process equipment. Various size hp chillers 16 maintain supply process fluid at temperatures between −80° C. and +200° C., within +1° C. of the setpoint, while a heat exchanger module 18 maintains the process fluid temperature between facility water temperature and +200° C., within ±2° C.

Table 1-1 summarizes safety features incorporated in modules such as a chiller 16 and heat exchanger 18.

TABLE 1-1

Summary of Safety Features

| Component | Operation |
|---|---|
| Emergency off button (EMO) | Pressing button on front of unit places process equipment in safe non-operable mode by shutting off power to all major system components in either REMOTE or LOCAL modes. Must be reset to return to operating mode. |

TABLE 1-1-continued

Summary of Safety Features

| Component | Operation |
|---|---|
| High pressure switch | Protects the compressor against high discharge pressure. Switch opens at 350 psig, (+/− 25 psig). Stops compressor in Local or Remote modes, and alerts central control of impending problem in Remote mode. |
| Heat transfer fluid temperature shutoff | A thermocouple measuring the temperature of the heat transfer fluid causes the PLC controller to shut off power to the heaters if the process fluid temperature raises to more than 10° C. above the max. global temperature setpoint. |
| Electric heater over temperature switch | Switch in contact with heater housing opens when temperature exceeds max. temp, shuts off power to the heater. Activation causes latching relay to open, requiring manual reset. |
| Reservoir pressure relief valve | Vents air/vapor in the fluid reservoir to the catch basin when pressure exceeds 50 psig. |
| Heat Transfer Fluid flow meter | In the event that no flow is indicated, PLC controller shuts down power to heaters in that module. |
| Facilities water flow switch (Differential pressure switch or flow switch) | If the differential pressure across the inlet and the outlet of the facility water falls below 2 psid, a pressure differential switch will send a fault signal to the PLC controller and that will shut down all modules in the system. The fault will be logged into the fault history of the system and requires manual reset to restart. |
| Reservoir level sensor | A float switch inside the reservoir monitors the level of heat transfer fluid in the system: The first warning indicates reservoir should be filled. The second warning stops the module and indicates immediate need for filling. The second warning will be logged into the fault history of the module. The third warning is independent of the PLC controller and shuts the system down. The second and third warnings require a manual reset. |
| Pump over temperature switch | A bimetallic switch on pump housing sends a signal to PLC controller when sensing an excessive temperature. The control will shut off the pump and heater and will lock the system out. Requires manual reset. |
| Compressor temperature switch (internal) | Protects the compressor against high temperature operation. Stops compressor in Local or Remote modes, and alerts central control of impending problem in Remote mode. Switch is auto resetting, but compressor module requires manual resetting of main circuit breaker for continued operation. |
| Limit switch | When the electrical enclosure lid is removed the power circuits are interrupted. |

The control system 12 also includes a substantial number of other features, which contribute to convenient operation (Table 2-1) or security against faulty operation (Table 2-2).

TABLE 2-1

Control switches with their effect.

| CONTROL OR INDICATOR | ACTION OR READING |
|---|---|
| EMO switch | Cuts off power to the TCS as it turns off all components in the tool string. Connected to central control and works in either Remote or Local mode. A message appears on the screen, "EMO Button Pressed". |
| Remote/Local switch | Toggles the TCS between Remote and Local mode. |
| Reservoir level message | Process fluid level sensors; first warning indicates reservoir should be filled. A message appears on the screen, "Reservoir Level Warning". Second warning stops the module and indicates immediate need for filling. The second warning will be logged into the fault history of the module and |

TABLE 2-1-continued

Control switches with their effect.

| CONTROL OR INDICATOR | ACTION OR READING |
|---|---|
| | requires manual reset to restart. A message appears on the screen, "Reservoir Level Fault". Third warning stops the module and locks out the system. The fault will be logged into the fault history of the system and requires manual reset to restart. A message appears on the screen, "Low Level Lockout Alarm". |
| Alarm reset button | Pressing of reset button is required for initial start up of TCS, and to reset safety interlocks after SEMI S2 interlock has shut down system. |
| Hour meter | Accumulates hours that the TCS has been powered up. |
| Main disconnect | Applies power to the entire system. Located on top of the electrical box. |
| RS485 Connector for remote communication | The central computer commnnicates data and control information with the TCS through this connector. Located on rear electrical panel. |
| EMO Connectors | Allows TCS to be interconnected 24 v safety daisy chain safety circuit. Located on rear electrical panel. |

TABLE 2-2

Warnings with their effect or information transmitted.

| ALARM LIST | ACTION OR READNG |
|---|---|
| PHASE ROTATION | Indicates that the rotation of the incoming three phase power is reversed; unit not allowed to operate. A message appears on the screen, "Phase Monitor Alarm". Unit must be shut down, wiring corrected and powered back up to clear alarm. |
| FACILITY WATER FLOW SWITCH | If the differential pressure across the inlet and the outlet of the facility water falls below 2 psid, a differential pressure switch will send a fault signal to the PLC controller and that will shut down all modules in the system. The fault will be logged into the fault history of the system and requires manual reset to restart. A message appears on the screen, "Facility Water Flow Alarm". |
| HIGH PRESSURE SWITCH | High Pressure switch protects compressor against high discharge pressure. Switch opens at 350 psig, (+/− 25 psig) and shuts down the module. The fault will be logged into the fault history of the module and requires manual reset to restart. A message appears on the screen, "Refrigerant High Pressure Alarm". |
| COMPRESSOR FAULT | In case of compressor shut down, due to any reason, a fault will be logged into the fault history of the module and requires manual reset to restart. A message appears on the screen, "Compressor Overload Alarm". |
| HEATER OVER TEMPERATURE | In case of heater shut down, due to overtemperature or overcurrent safety devices, a fault will be logged into the fault history of the module and requires manual reset to restart. A message appears on the screen, "Heater Over Temperature Alarm". |
| PUMP MOTOR OVER LOAD | In case of pump shut down, due to any reason, a fault will be logged into the fault history of the module and requires manual reset to restart. A message appears on the screen, "Pump Motor Overload Alarm". |
| THERMOCOUPLE BREAK | In case that a thermocouple breaks, a fault will be logged into the fault history of the module and requires manual reset to restart. A message appears on the screen, "Thermocouple Break Alarm". |
| SETPOINT OUT OF RANGE | If the temperature input is more than maximum setpoint limit or less than minimum setpoint temperature limit, the PLC Controller will disregard the input and use the last temperature setpoint. Meanwhile a message appears on the screen, "Setpoint Out Of Range". |

TABLE 2-2-continued

Warnings with their effect or information transmitted.

| ALARM LIST | ACTION OR READNG |
|---|---|
| TEMPERATURE RUN AWAY | As described on page 15 | i) The various display screens of the system, referring now to FIG. 8 (a–m), present concise but complete information and choices for the operator at each stage. The individual screens and their content are such that operator instruction can be shortened and the skill level demanded can be reduced. Taking a typical sequence of "screens" to illustrate this aspect:

Start-up and Opening, Screens—(a)

The first (Start-up) screen is introductory and momentary and automatically converts to the second.

The Opening Screen offers three options, enabling the operator to bypass Summary and Start Up steps if desired.

Summary Screen—(b)

This conveniently displays the TCU modules being used, their setpoints and operative conditions.

In addition the operator is offered choices as to Module starting and displays.

Start-up Procedure Screen—(c)

Gives a brief overview of the procedure required to start-up a new system.

The operator can use the Quick Fill/Drain procedure that is provided separately, but is not directly relevant to the control system and therefore is not shown.

Configuration Screen—(d)

The configuration screen shows the unit configuration and gives access to the Touch Screen Manager and Field Service screens The modular configuration is displayed graphically showing the location of the modules in the chassis.

The screen also displays system run hours.

Displays the control part number and software revision.

The field service button is used to prompt a service technician as to the information needed for phone support.

The Touch Screen Manager screen allows for adjusting and calibrating the touch panel.

Field Service Screen—(e)

This screen lists the information that should be recorded before contacting Product Support staff.

Touching the Back button will return to the Opening Screen

Touch Screen Manager Screen—(f)

Increase/Decrease Contrast—These buttons adjust the contrast of the touch panel.

Calibrate Screen—Touching this button starts a routine which allows the user to calibrate the touch panel.

Clean Screen—Touching this button suspends touch panel input for 30 seconds allowing the touch screen to be wiped without effecting unit operation.

Touching the Back button will return to the Opening Screen

Control Screen—(g)

The operator can start and stop a module by pressing the Start/Stop button.

Gives specific information about the module including flow, pressures, setpoints, process fluid temperature and heat/cooling output.

The message box above the Start button gives status on the module operation.

Alarm Reset—Used to clear faults

Set Temp—Displays the current setpoint temperature. The setpoint can be changed by touching the setpoint value on the touch panel.

Fault Help Screen—Activates a help screen pertaining to the highest level active fault.

Engineering Menu Screen—This is a password protected area for entering user and technician configurable information.

Alarm History Screen—(h)

a) The number of the fault being displayed in the message window (Fault #1 is the most recent fault).

The operator presses the Next Alarm button to toggle through the last 10 system faults.

Pressing the Summary Screen button initiates return.

Help Screens—(i)

Context sensitive help is available for faults which are displayed in the information window of the Module Control Screen.

Password Screen—(j)

The operator touches the password box and enters either the user or technician password.

The numeric data input screen is used to input user selectable values.

Engineering Menu Screen—(k)

This screen provides access to user adjustable parameters.

The parameters are PID settings and system set-up information

PID Set-up Screen—(l)

This screen is used to enter the P, I, and D values for the heating and cooling loops. The values are factory set and should not need to be changed.

The Set Factory Default Values button is used to restore original factory values.

Error Range—Used to set the range around the setpoint for which a local system fault will be activated if temperature deviation is outside the range.

Temp Offset—Allows the temperature reading to be calibrated.

Address is used to set the correct communication address for remote operation.

System Set-up Screen—(m)

This screen is used to select the unit system for displaying system parameters.

It also allows the user to set the pump delay stop time. This is the duration of time the pump will continue to run after a system fault occurs.

i) It will be appreciated that the organization and implementation of this system not only adapts to the specific interaction, monitoring and energizing requirements of different ones of a variety of active modules, but also uniquely presents information as well as selection options to an operator.

ii) Although various alternatives and expedients have been presented above and shown in the drawings the invention is not limited thereto but encompasses all forms and variations within the scope of the appended claims.

We claim:

1. A method for adaptively controlling the operation of a temperature control system having both heating and cooling capabilities and different operational modes to adjust the temperature of a thermal transfer fluid supplied to a process tool, the system receiving a cooling medium of inconstant temperatures and monitoring the adjusted temperature, the method comprising the steps of:

establishing separate but dual proportional, integral and derivative (PID) control algorithms for the heating and cooling capabilities;

loading in initial PID values for the operational mode that is chosen;

operating the system in accordance with the algorithm to adjust the temperature toward a target value;

monitoring the adjusted temperatures and its variations with time;

increasing the integral values of both PID algorithms if the adjusted temperature oscillates and loading different bias values into the PID calculation in response to temperature variations in the cooling medium.

2. The method as set forth in claim 1 above, further including the steps of resetting/suspending the use of the heating capability by resetting the heating PID during cooling and non-transitional periods when the adjusted process temperature is more than a selected amount above the bias offset setpoint level selected for the operational mode.

3. The method as set forth in claim 2 above, the heating PID is reinstated by loading in a variable bias-value when the adjusted bias offset setpoint is more than about 2° C. less than the setpoint level.

4. The method as set forth in claim 3 above, wherein the temperature control system circulates the thermal transfer mass with minimal fluid storage in the loops, and maintains the fluid and the process tool within ±1° C. of selected levels in steady state operation while transitioning to a different level with minimal delay.

5. The method of claim 1 above, wherein the temperature control system comprises at least two temperature control units operating independently in individual operation modes, and wherein the method further comprises establishing PID algorithms for each of the temperature control units.

6. The method of claim 1 above, wherein the temperature control units include at least two of different types and wherein the method further comprises establishing independent dual PID algorithms for each different temperature control unit.

7. A control system for operating from one to a number of temperature control units each having both heating and cooling capability to regulate the temperature of a thermal transfer fluid circulating through an associated process tool, comprising:

a data processor unit having interior EEPROM circuits storing invariant portions of control algorithms for the temperature control units;

a selectively variable external EEPROM associated with the internal EEPROM to provide therewith adaptive dual PID algorithm for enabling the data processor to command the heating and cooling capabilities of the temperature control units;

a data input device including a display, coupled to the data processor, for providing thereto initial perspective, integral and derivative setpoint values for the dual control algorithms for each of the temperature control units;

temperature sensing devices providing thermal transfer fluid temperature readings for each of the circulating fluids to the data processor;

circuits for detachably coupling the data processor to the individual temperature control units to enable removal and replacement of individual control units without affecting operation of other individual control units, and the data processor including progress means for displaying a range of status indications as to system operations.

8. The control system as set forth in claim 7 above, wherein the data processor is configured with modular inputs and outputs, such that input units can be changed as changes are made to the temperature control units, and wherein the system includes low voltage switching circuits interconnected between the data processor and the power connections to the individual temperature control units for allowing safe removal of power connections.

9. The control system as set forth in claim 8 above, wherein the data processor unit includes performance monitoring software generating data for the display of the input device, including temperature set points, actual temperatures, and percentage of heating and cooling, flow rate, reservoir pressure and pump pressure.

10. A control system as set forth in claim 9 above, wherein the data processor includes software for indicating alarm conditions, software for providing safety commands in the event of non-normal conditions, and instructional commands to enable an operator to set up and check the system.

11. A control system as set forth in claim 7 above wherein the process tool system has command capability for signaling desired operating levels for some or more process tools, and the data process includes communication circuits for alternatively selecting commands from the process tool system.

12. The method of controlling the temperature of a thermal transfer fluid passing through a thermal control unit having both heating and cooling capabilities so as to provide, with relatively low power consumption, precisely controlled steady state operation at a target temperature and rapid transitions between temperature levels, comprising the steps of:

1) employing systematic PID loop control sequences for the heating and cooling capabilities;

2) choosing initial set point values for approaching a target temperature value using the PID loop control sequences;

3) monitoring actual fluid temperatures to accumulate historical changes in approaching the target value;

4) changing set point values for the integral term in accordance with the historical performance;

5) terminating usage of the heating capability during those times when the temperature of the thermal transfer fluid is higher than a first predetermined amount relative to the target value or the operational mode is transitioning to a lower temperature, 6) Resuming dual PID control for temperatures below the bias offset setpoint, and 7) Suspending heating PID control for temperatures above the bias offset setpoint.

13. A method as set forth in claim 12 above, wherein the method further includes the step of measuring the amount of error between the set point and the target value over predetermined time intervals, and resetting the integral bias term in accordance with the magnitude of the error over such intervals.

14. The method as set forth in claim 13 above, wherein the proportional term in the PID system comprises the product of error amplitude times gain, wherein the integral term comprises the summation of error signals over a period of time multiplied by gain and wherein the derivative term comprises the rate of change of the error signal with time multiplied by gain.

15. The method as set forth in claim 14 above, wherein the first predetermined amount is greater than about 1° C. than the target value and wherein the second predetermined amount is about 0.2° C. or less than the target value, and wherein the method operates to provide a steady state operation with a temperature variation of ±0.1° C.

16. An expandable system for controlling the temperature of operation of more than one process tool, with independent flows of thermal transfer fluid comprising:

at least two temperature control units, each circulating thermal transfer fluid through a different process tool in response command signals, the temperature control units having heating and cooling capabilities that are separately controllable;

a central processor providing command signals to control the separate heating and cooling capabilities of all the temperature control units;

instrumentation providing inputs to the central processor indicative of the temperature levels of thermal transfer fluid flows at the process tools;

programmable logic circuits at the central processor and functioning with the processor to provide at least two concurrent program sequences, one for heating and one for cooling, for each thermal control unit, and and software operable with the central processor for varying the program sequences in accordance with real time variations in the thermal transfer fluid temperatures.

17. A system as set forth in claim 16 above, wherein the system operates to maintain each process tool at selected temperatures at different levels, with minimum transition times between temperature levels and with steady state levels being maintained with high precision, comprising in addition sensors associated with the circulating thermal transfer fluid for providing signals representing the temperature levels thereof to the central processor, with the programmable logic circuits and central processor providing separate heating and cooling commands in accordance with proportional, integral and derivative terms.

18. The system as set forth in claim 17 above, wherein the control processor includes a modular expandable array of transducer devices responsive separately to operative conditions in the associated thermal control units.

19. The system as set forth in claim 18 above, including in addition a touch screen display and interface coupled to the central processor, and the central processor includes a data storage system retaining initial set point values for the control loops, selectable by use of the touch screen and display.

20. A system as set forth in claim 19 above, wherein said system programming detects marginal conditions by comparing sensed values to preset limits.

* * * * *